United States Patent [19]

Wilson

[11] 4,374,445
[45] Feb. 22, 1983

[54] CLEANING DEVICE FOR USE WITH A DIP STICK

[75] Inventor: George L. Wilson, Cobourg, Canada

[73] Assignee: Michal Kachur, Guelph, Canada

[21] Appl. No.: 237,581

[22] Filed: Feb. 24, 1981

[30] Foreign Application Priority Data

Mar. 27, 1980 [CA] Canada ............................ 348774

[51] Int. Cl.³ .................................................. F01M 11/12
[52] U.S. Cl. .................................... 15/210 B; 15/218.1
[58] Field of Search ........................... 15/210 B, 218.1

[56] References Cited

U.S. PATENT DOCUMENTS

| | | | |
|---|---|---|---|
| 2,453,452 | 11/1948 | Nielsen | 15/210 B |
| 4,010,512 | 3/1977 | Addison et al. | 15/210 B |
| 4,207,645 | 6/1980 | Suckling | 15/210 B |
| 4,282,624 | 8/1981 | Cobb | 15/210 B |

FOREIGN PATENT DOCUMENTS 1041308 5/1953 France ............................ 15/210 B

*Primary Examiner*—Robert L. Bleutge
*Attorney, Agent, or Firm*—Daryl W. Schnurr

[57] ABSTRACT

A cleaning device is provided for use with a dip stick of the type normally found in internal combustion engines to measure the oil level. The device has a housing with an inner surface and a layer of absorbent material located thereon. The housing is shaped so that part of the dip stick can be laterally inserted within the housing in such a manner that the dip stick can be cleaned of excess fluid by pulling it longitudinally from the housing. The device has a magnet so that it can be mounted conveniently adjacent to the dip stick with which it will be used. Previously, various materials such as rags have been used to clean the dip stick while measuring a fluid level. This has not been satisfactory as a rag or suitable substitute was not readily available at all times and often the checking of the oil was over-looked.

5 Claims, 4 Drawing Figures

CLEANING DEVICE FOR USE WITH A DIP STICK

BACKGROUND OF THE INVENTION

1. Field of the Invention

This patent relates to a cleaning device for use with a dip stick of the type normally found in internal combustion engines to measure the oil level.

2. Description of the Prior Art

Internal combustion engines are normally provided with a dip stick to enable the oil level to be readily checked. A common method of checking the oil level is to remove the dip stick from the engine, wipe it clean with a rag, reinsert it into the engine and remove it to take an oil level reading. It is extremely important that the oil level be checked regularly as insufficient oil can result in costly repairs to the engine. In industrial applications, it is not unusual to check the oil level of engines on a daily basis.

Problems are sometimes encountered in locating a suitable rag to wipe the dip stick. When a rag is not readily available, additional time is often incurred as unsuitable material such as nearby foilage, bare fingers or clothing are used, or the checking of the oil level is simply overlooked.

An object of the present invention is to provide a cleaning device for a dip stick which can be safely stored adjacent to the engine and is always readily available for use.

The device of the present invention is not restricted to use with a dip stick to measure the oil level of internal combustion engines. The device can be used for virtually all types of dip sticks, for example, to measure the level of automatic transmission fluid.

SUMMARY OF THE INVENTION

This invention relates to a cleaning device for use with a dip stick. The device comprises a housing having an inner surface with a layer of absorbent material located thereon. The housing is shaped so that part of the dip stick can be laterally inserted within said housing in such a manner that excess fluid can be removed from said stick by pulling the stick longitudinally from the housing.

Preferably, the housing has a substantially U-shaped cross-section and the absorbent material is located so that part of the dip stick can be laterally inserted within the housing in such a manner that said part is substantially surrounded by absorbent material.

Preferably, there are means to mount the device so that it can be conveniently mounted adjacent to the dip stick with which it is to be used.

BRIEF DESCRIPTION OF THE DRAWINGS

An embodiment of the invention is described in greater detail in the following drawings.

DESCRIPTION OF A PREFERRED EMBODIMENT

Figure 1:
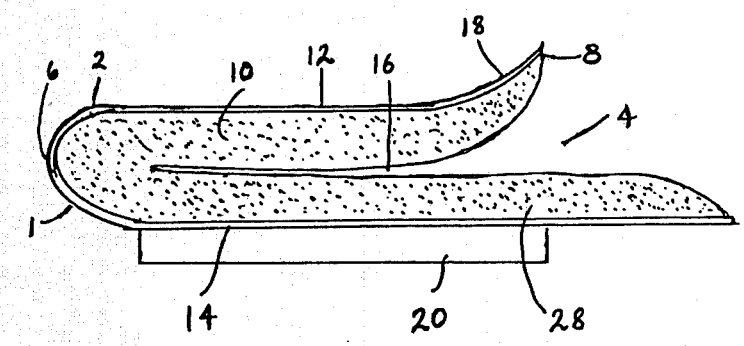
FIG. 1 is a side view of the cleaning device of the present invention.

Referring to FIG. 1 in greater detail, a cleaning device 1 of the present invention is shown. A housing 2 of substantially U-shaped cross-section has an open end 4 and a closed end 6 with an inner surface 8. Any suitable rigid material that can be formed into the desired shape can be used for the housing 2. Preferably, the material is rigid, but slightly flexible and non-corrosive. An example of a suitable material is aluminum or plastic. An absorbent material 10 is located on the inner surface 8, the absorbent material 10 having a similar size and shape to said inner surface and covering said surface. Preferably, the absorbent material is sponge or felt.

The device 1 has a front 12 and back 14 with a space between the front and back layers of absorbent material 10. The space 16 tapers outward towards the open end 4 of the housing 2. In addition, the back 14 of the device 1 is slightly longer than the front 12 and the front curves smoothly outward at point 18 near the open end 4. The absorbent material 10 can be affixed to the inner surface 8 by any suitable means but is preferably glued to said surface by a suitable adhesive.

Figure 4:
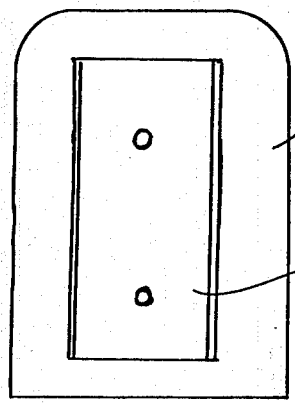
FIG. 4 is a rear view of the device.

On the back 14 of the device, there is located means 20 to mount the device at a suitable location. Preferably, the means 20 is a magnet or VELCRO, a trade mark, which is rigidly affixed to the back (see also FIG. 4). The advantage of the magnet or VELCRO is that the device 1 can be easily mounted in a place convenient to the dip stick with which it is to be used so that it is always available. Also, the device can be easily unmounted when it is desired to use the device to clean the dip stick or to have the device itself cleaned. Various means of mounting the device will be readily apparent to those skilled in the art. For some applications, a magnet may not provide sufficient holding power to hold the device in the place where it is mounted when the engine is being carried over rough terrain. It may be desirable to slidably mount the device in a channel which is rigidly affixed to the mounting surface. It may also be desirable to mount the device relatively permanently adjacent to the dip stick and clean the dip stick without unmounting the device. If it is desirable to clean the absorbent material, the absorbent material could be made removable from the housing while the housing itself remains mounted adjacent to the dip stick. In any event, the device 1 can be easily stored near the dip stick with which it will be used.

Figure 2:
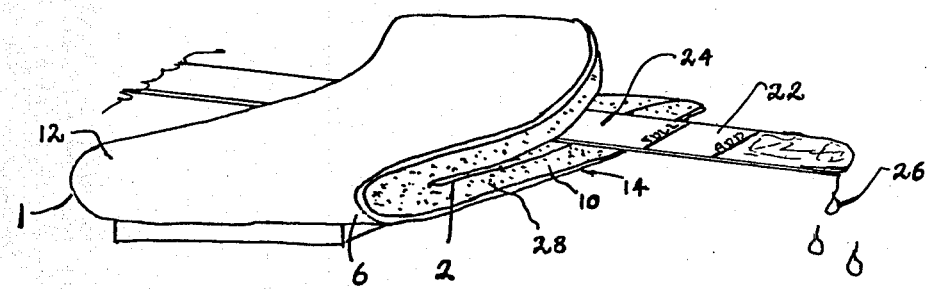
FIG. 2 is a perspective view showing part of a dip stick inserted into the device.

For example, for use with an automobile engine, the device can be stored underneath the hood of the automobile. When it is desired to check the oil level of the engine, the device will therefore be readily available. The device can be removed from its place of storage and held in one hand while a dip stick 22 is held in the other (see FIG. 2). A part 24 of the dip stick 22 being between the handle (not shown) and the excess fluid or oil 26 is inserted laterally into the device 1 through the open end 4. The dip stick 22 is inserted sufficiently close to the closed end 6 so that the material 10 substantially surrounds that part 24 of the dip stick 22 within the housing 2. If the housing is slightly flexible, the front 12 and the back 14 can be squeezed closer together to increase the pressure of the absorbent material 10 on the dip stick 22. As the dip stick is pulled longitudinally from the device 1 (ie. in a direction substantially perpendicular to the side 28), the excess fluid or oil 26 is substanially removed.

The dip stick 22 can then be re-inserted into the engine and removed to measure the oil level.

Figure 3:
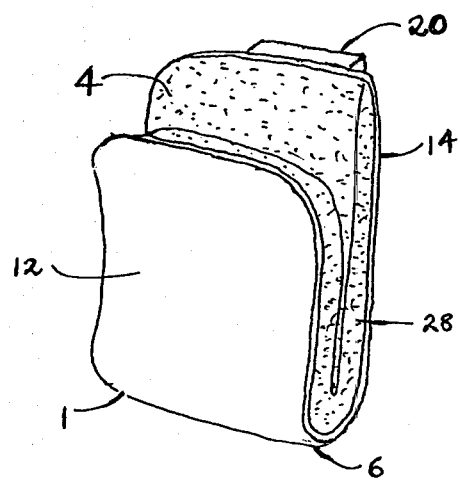
FIG. 3 is a perspective view of the device in an upright position.

As the device 1 is readily removable and portable, the sponge can easily be cleaned with soap and water from time to time to remove much of the oil. Variations in the shape of the device will be readily apparent to those skilled in the art. Also, size will vary with the particular use and larger devices will obviously be used for use with larger dip sticks. FIG. 3 of the drawings is self-explanatory.

What I claim as my invention is:

1. A cleaning device for use with a dip stick said device comprising a housing having a substantially U-shaped cross section defining two sides and a base, said housing having an inner surface that is completely covered by a layer of absorbent material said housing having a width in the area of said base substantially equal to twice the depth of the layer of absorbent material so that the absorbent material on each side is in contact in the area of said base, the two sides defining a space between the absorbent material that tapers outwards from the area of the base to an open end of said housing, the housing being made of rigid but flexible and resilient material so that the absorbent material on each side can be pressed together when part of a dip stick is laterally inserted and released to return to its original position after the dip stick has been longitudinally removed, thereby cleaning the dip stick of excess fluid.

2. A device as claimed in claim 1 wherein one side of the device is slightly longer than the other side and the shorter side curves outwards near the open end.

3. A device as claimed in claim 1 wherein there are means to mount the device.

4. A device as claimed in claim 3 wherein the means to mount the device comprises a magnet rigidly affixed to the back of the device.

5. A device as claimed in any of claims 1, 3 or 2 wherein the absorbent material is made of sponge.

* * * * *